(12) United States Patent
Stern

(10) Patent No.: US 10,893,721 B2
(45) Date of Patent: Jan. 19, 2021

(54) HYBRID MATERIAL

(71) Applicant: Douglas Evan Stern, Providence, RI (US)

(72) Inventor: Douglas Evan Stern, Providence, RI (US)

(*) Notice: Subject to any disclaimer, the term of this patent is extended or adjusted under 35 U.S.C. 154(b) by 961 days.

(21) Appl. No.: 15/330,811

(22) Filed: Nov. 7, 2016

(65) Prior Publication Data

US 2017/0295885 A1  Oct. 19, 2017

Related U.S. Application Data

(60) Provisional application No. 62/252,141, filed on Nov. 6, 2015.

(51) Int. Cl.
*A43B 13/20* (2006.01)

(52) U.S. Cl.
CPC ........ *A43B 13/206* (2013.01); *F16F 2226/04* (2013.01)

(58) Field of Classification Search
CPC ...... A43B 13/203; A43B 13/206; A43B 13/20
See application file for complete search history.

(56) References Cited

U.S. PATENT DOCUMENTS

| | | | | |
|---|---|---|---|---|
| 5,113,599 A | * | 5/1992 | Cohen | A43B 17/035 36/114 |
| 6,553,691 B2 | * | 4/2003 | Huang | A43B 17/035 36/29 |
| 7,409,779 B2 | * | 8/2008 | Dojan | A43B 7/144 36/29 |
| 7,757,409 B2 | * | 7/2010 | Snow | A43B 13/20 36/28 |
| 8,720,473 B2 | | 5/2014 | Almeida et al. | |
| 9,498,020 B2 | * | 11/2016 | Almeida | A43B 17/026 |
| 10,086,730 B2 | * | 10/2018 | Dry | B60N 2/914 |
| 2015/0208761 A1 | | 7/2015 | Almeida et al. | |

* cited by examiner

*Primary Examiner* — Jason L Vaughan
(74) *Attorney, Agent, or Firm* — Adler Pollock & Sheehan P.C

(57) ABSTRACT

A process of making a family cell of homogenous inner bladders with varying elasticity includes a forming a plurality of inner bladders from a first material with a first elasticity. The inner bladders have interior surfaces during inner chambers and exterior surfaces exposed to an outside environment. The inner chambers are configured to store a fluid. A family cell is formed by fluidly connecting the inner bladders. One or more hybrid bladders are selected from the inner bladders and a second material having a second elasticity is applied to the hybrid bladders. The second elasticity is less than the first elasticity, such that the second material reduces the elastic qualities of the hybrid bladder.

14 Claims, 18 Drawing Sheets

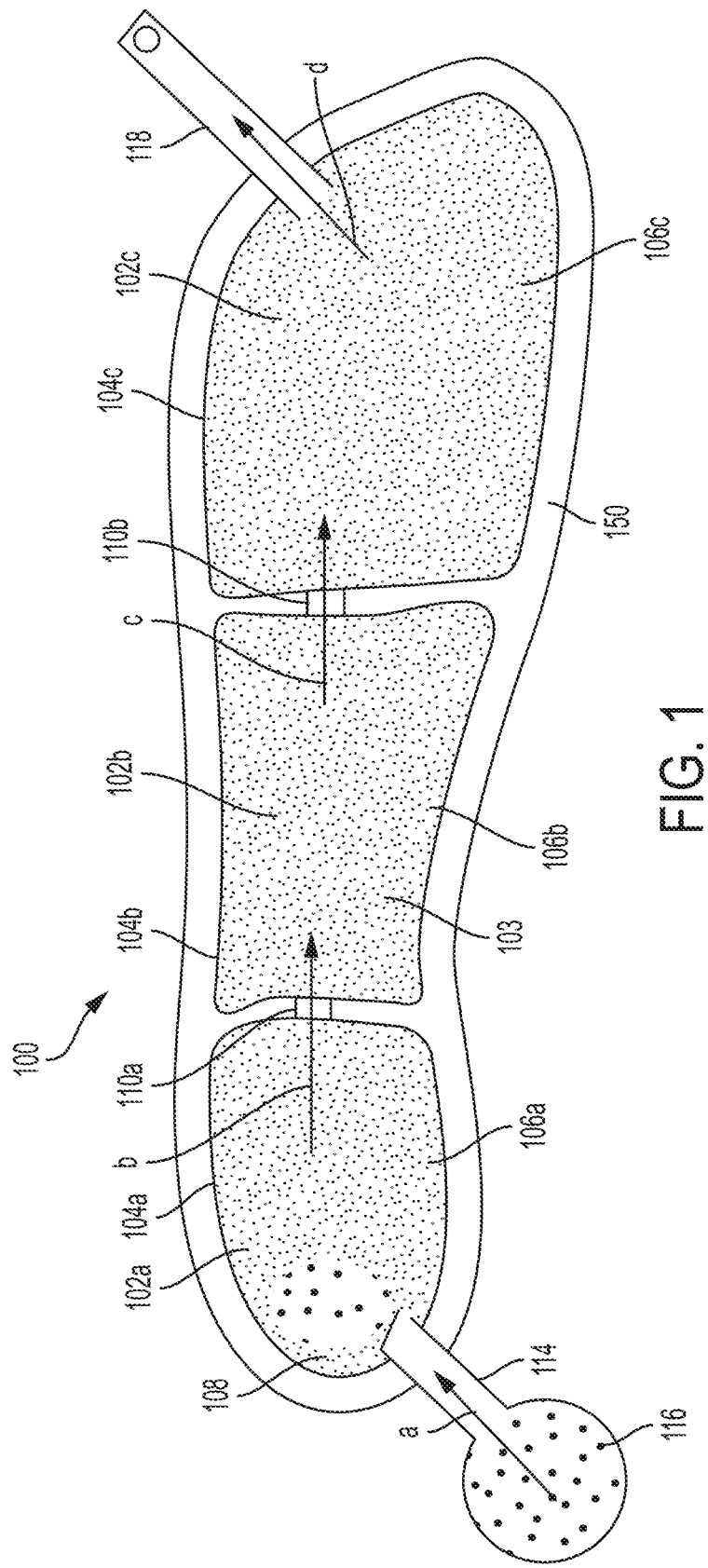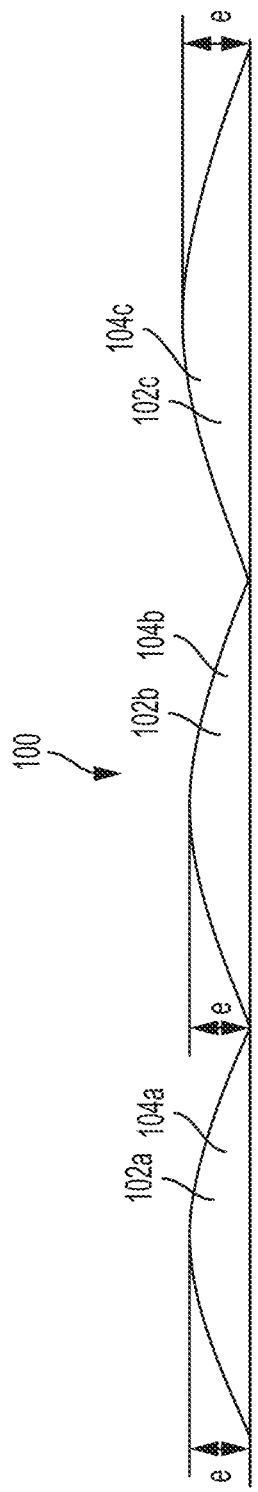

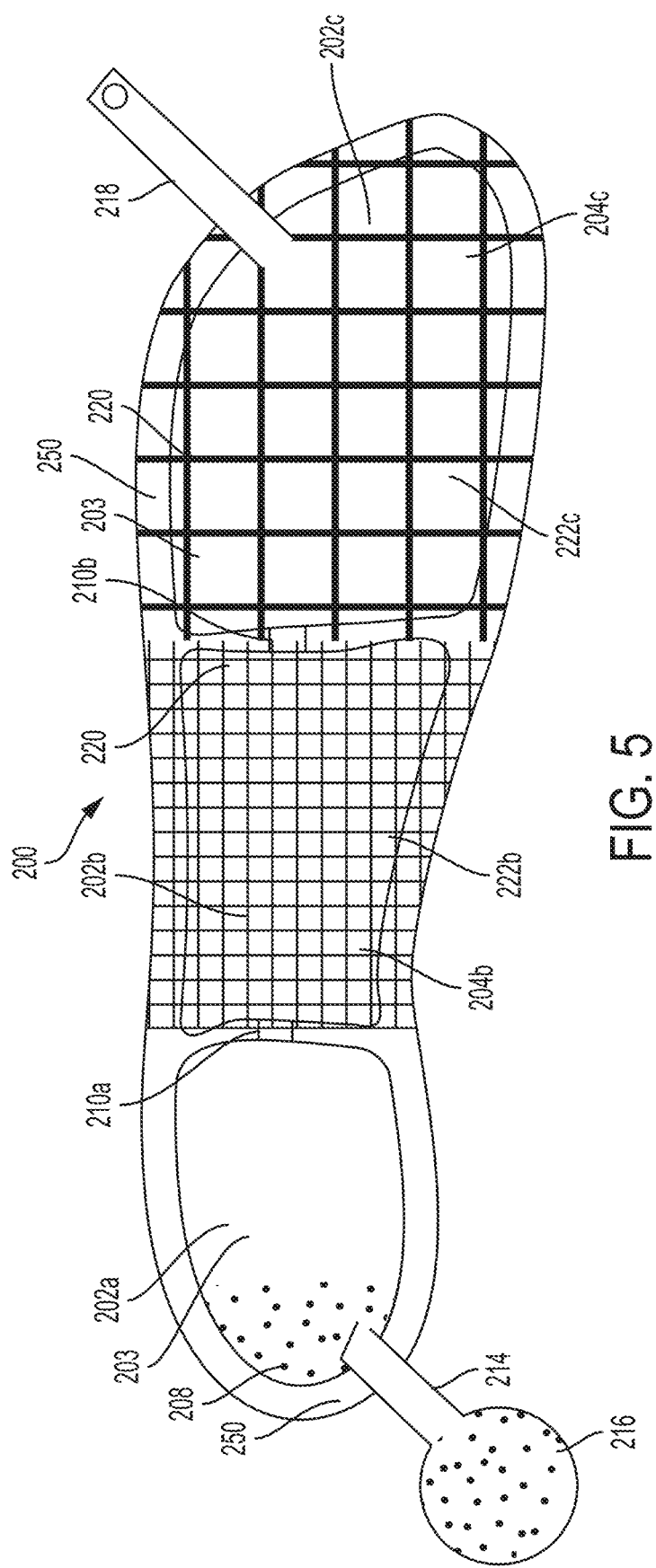
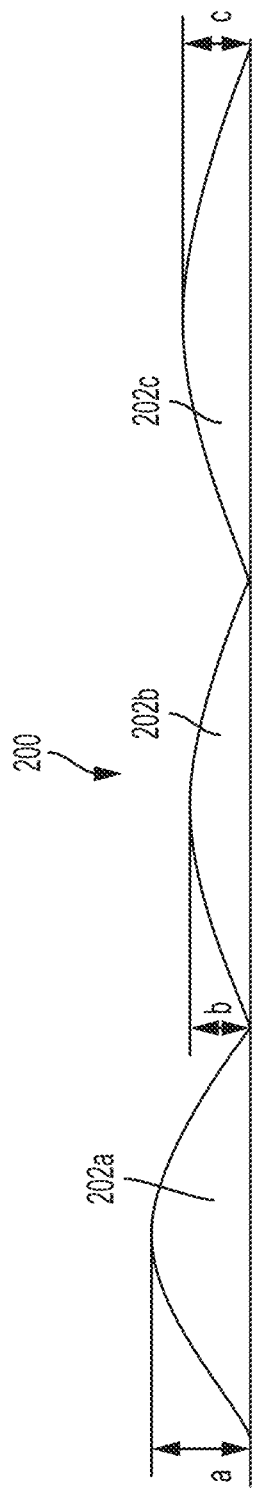
FIG. 5
FIG. 6

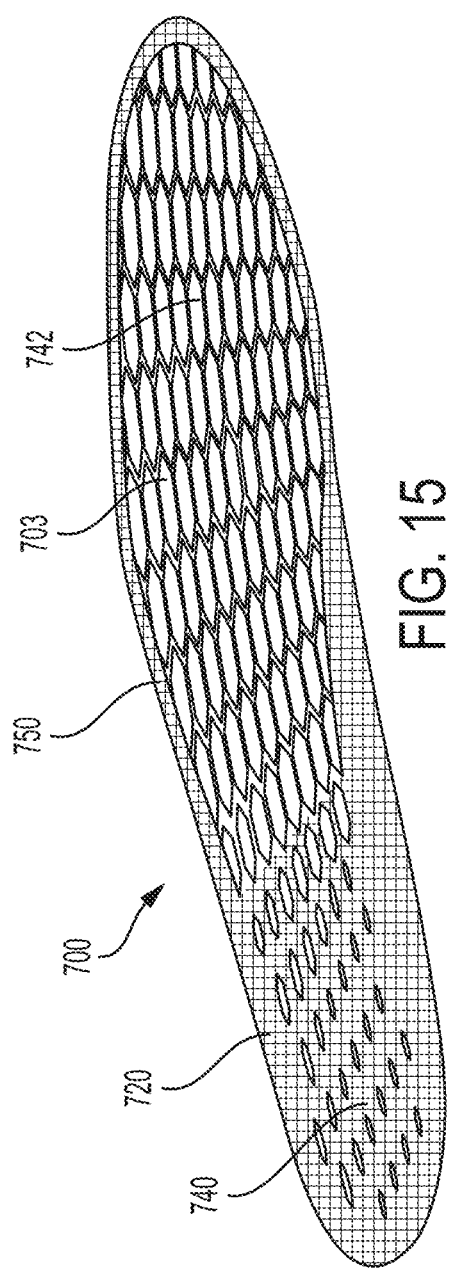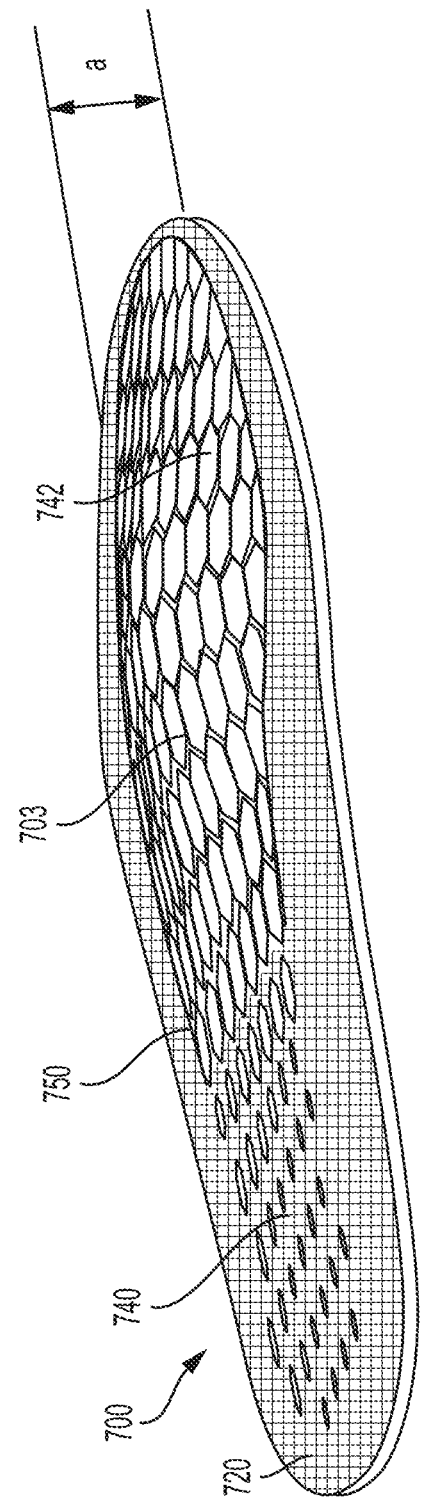

HYBRID MATERIAL

CROSS-REFERENCE TO RELATED APPLICATION

This application claims priority to U.S. Provisional Patent Application No. 62/252,141 filed on Nov. 6, 2015, which is incorporated herein by reference.

FIELD OF THE INVENTION

The subject disclosure relates to a manufacturing method and product for controlled reduction of elastomeric capability to change elongation characteristics in material.

BACKGROUND OF THE INVENTION

Many patented technologies, although novel and non-obvious, can also be determined to be cost prohibitive and non-manufacturable. This is the case for some hybrid materials such as materials that require the combination of multiple materials to create materials for achieving results such as the need to create different elastomeric capability materials for the manufacture of products relating to cell flow technology.

Cell flow technology as described in U.S. Pat. No. 8,720,473 issued to Alemida et al. and U.S. Patent Publication US 2015-0208761 A1, published on Jul. 30, 2015, each of which is incorporated herein by reference. Cell flow technology is reliant on both the ability to hold gas or liquid as well as control the elongation and flow between each of the individual bladders. There is a need to be able to manufacture hybrid materials in a cost effective way using a superior method.

One way to achieve different capability between sealed bladders is to separate the bladders with the use of valves and channels. This creates separate sealed bladders that can use different materials to achieve varied densities or elastomeric capability. This method is both costly and often creates an unsightly final product.

Another way to achieve multiple bladders with different capability is to create hybrid material by edge or seam bonding the material together prior to welding the material into a bladder. This is both costly and problematic. Similarly, using multiple layers and variable quantities of layers while bonding to a bladder is problematic because it is harder to achieve a tight seal and create a leak-proof bladder. This method is particularly difficult to implement when the product will be used in a cushion, as the resultant product can have a surface which is uncomfortable for a user.

SUMMARY

In one embodiment, the subject disclosure relates to a product, process, or method for manufacturing a hybrid material having dual qualities that is practical and cost effective. Further, the subject disclosure relates to a product, or method or process of making a product that is leak-proof and comfortable for a user.

In one embodiment, the subject technology is directed to a process of making a family cell of homogenous inner bladders with varying elasticity. The process includes forming a plurality of inner bladders from a first material, the first material having a first elasticity. Each of the plurality of inner bladders has an interior surface defining an inner chamber, the inner chamber configured to store a fluid therein. An exterior surface of the inner bladders is exposed to an outside environment.

A family cell is formed by fluidly connecting the plurality of inner bladders. At least one hybrid bladder is selected from the plurality of inner bladders. On the exterior surface of at least one hybrid bladder, a second material having a second elasticity is placed. The second elasticity is less than the first elasticity and the second material reduces the elastic qualities of one or more of hybrid bladders.

The second material can be one of the following: molded; laminated; cast; or silk screened. In at least one embodiment, second material increases heat dissipation across one or more of the hybrid bladders. The second material can also increase air circulation across the at least one hybrid bladders. In at least one embodiment, family cell can be connected to a sports helmet to reduce the likelihood of head injuries.

The hybrid material can be arranged in a variable pattern. The variable pattern can dampen vibrations across one or more of the hybrid bladders. The variable pattern can also create at least one zone of varying elasticity across the family cell. At least one variable pattern can correspond with a pressure mapping diagram, the pressure mapping diagram reflecting areas of expected pressure between a cushion and a user.

The second material can have a hardness of 65 to 85 Shore A. The second material can be formed by copper or diamond paste. The second material can be formed from polymer urethane and can shield one or more hybrid bladders from electromagnetic and radio waves. The second material can be silicone and can dissipate heat across one or more hybrid bladders.

In one embodiment, the subject technology is directed towards a cushion. The cushion has an inner bladder having a first material of a first elasticity. The cushion also has a second material having a second elasticity. The second material is connected to an exterior surface of the inner bladder and forms a part thereon. The second material reduces the elasticity of the inner bladder. The cushion may be employed with the innersole of a shoe.

In another embodiment, the subject technology relates to a method of controlling elongation of connected fabrics. The method includes connecting at least two first fabrics, the first fabric formed by a first material having a first elasticity. The method also includes attaching a second fabric, the second fabric formed by a second material having a second elasticity to the first fabric. The second elasticity is substantially less than the first elasticity. The second material can form at least one variable pattern. In some embodiments, at least one variable pattern corresponds with a pressure mapping diagram, the pressure mapping diagram reflecting areas of expected pressure between a cushion and a user.

It should be appreciated that the subject technology can be implemented and utilized in numerous ways, including without limitation as a process, an apparatus, a system, a device, and a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the attached drawings that illustrate the effect on just a flat stretch material and a welded bladder drawing illustrating the effect of the dampening on the welded bladder.

FIG. 1 is an overhead view of a family cell employed with a shoe sole.

FIG. 2 is a side view of the shoe sole of FIG. 1.

FIG. 5 is an overhead view of a family cell in accordance with the subject technology, employed with a shoe sole.

FIG. 6 is a side view of the shoe sole of FIG. 5 showing the varying heights of the stretched inner bladders.

FIG. 15 is a perspective view of the family cell of FIG. 14 in a deflated state.

FIG. 16 is a perspective view of the family cell of FIG. 14 in an inflated state.

DETAILED DESCRIPTION OF PREFERRED EMBODIMENTS

Figure 3:
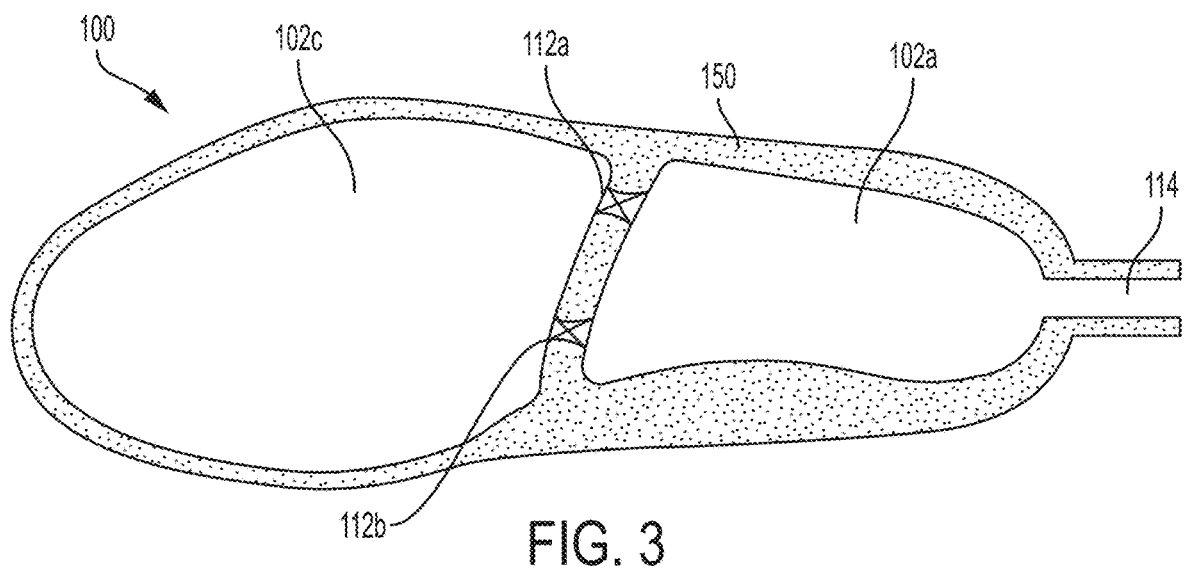
FIG. 3 is an overhead view of the shoe sole of FIG. 1 having a different bladder and conduit configuration.
Figure 4:
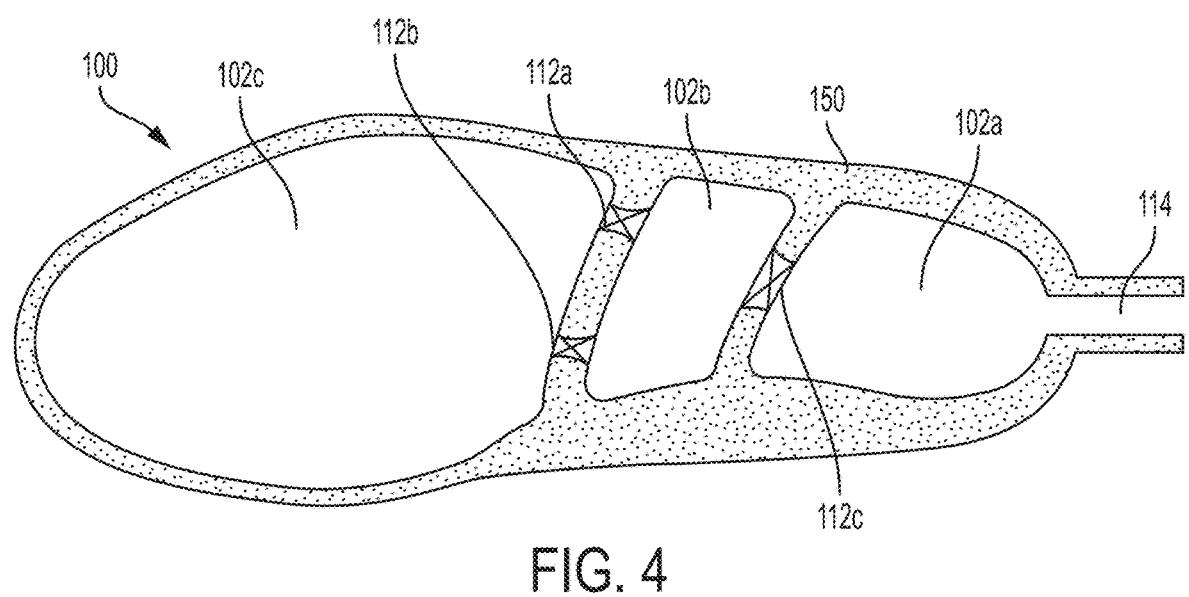
FIG. 4 is an overhead view of the shoe sole of FIG. 1 having a different bladder and conduit configuration.

The advantages, and other features of the system disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. It is understood that references to the figures such as up, down, upward, downward, left, and right are with respect to the figures and not meant in a limiting sense.

Referring to FIGS. 1-4, a family cell on a shoe sole 150 is shown generally at 100. The family cell 100 is formed by a series of homogenous inner bladders 102a-c, formed from a common first material 103 having a first elasticity. The inner bladders 102a-c have exterior surfaces 104a-c that are exposed to an outside environment (around the sole 150, not shown distinctly) and interior surfaces defining inner chambers 106a-c for storing fluid 108 (i.e. liquid or gas) which are fluidly connected by a series of conduits 110a-c. The conduits 110a-c may also include one or more valves 112a-c (FIGS. 3-4) to control fluid flow in a particular direction. An intake conduit 114 fluidly connects a pressure pump 116 to the inner chambers 106a-c, and thus, the family cell 100. The pressure pump 116 is operable to provide fluid pressure into the family cell 100 via the intake conduit 114. Arrow "a" represents the flow of fluid into the family cell 100 while arrows "b" and "c" show fluid flow throughout the family cell 100 via the fluid connection conduits 110a, 110b. A pressure release valve 118 can be fluidly connected to the inner chambers 106a-c (i.e. FIG. 1) to relieve any excess pressure. Arrow "d" shows the flow of fluid 108 out of the family cell 100 when the pressure has exceeded a set threshold.

The inner bladders 102a-c of the family cell 100, being formed from a similar first material 103, have similar elastomeric capability. For example, referring to FIG. 2, the inner bladders 102a-c are fluidly connected and share a common inner pressure. Since the inner bladders 102a-c have similar elastomeric capability and share a common inner pressure, they are stretched, by the inner pressure, to a similar length "e".

Referring now to FIGS. 5-6, a family cell 200 is shown embedded in a cushion for a shoe sole 250 in accordance with the subject technology. While the shoe sole 250 is shown for explanatory and illustrative purposes, it should be understood that the subject disclosure is operable within a wide range of technology, for example, in cushioning technology such as seat cushion, pillows, and helmets. The shoe sole 250 shown is different than the shoe sole 150 of FIGS. 1-4 in that it includes a second material 220 across two hybrid bladders 202b, 202c.

The second material 220 has a second elasticity that is less than that of the first material 203. Therefore, in the embodiment shown, different amounts of second material 220 are applied to the inner bladders 202b, 202c to form hybrid bladders 222b, 222c of varying elasticity, at particular locations of the shoe sole. For example, a large amount of second material 220 is provided on the middle bladder 202b under the arch portion of the sole 250 to form a hybrid bladder 222b with a greatly reduced elasticity. An intermediate amount of second material 220 is provided to the rightmost inner bladder 202c, under the metatarsal portion of the shoe, to form a hybrid bladder 222c with a somewhat reduced elasticity. Meanwhile the leftmost inner bladder 202a, located below the calcaneus portion of the sole 250, does not have any second material 220 attached to it. The hybrid bladders 222b, 222c have reduced elastic qualities as a result of the second material 220 affixed to the exterior surfaces 204b, 204c. For example, all three bladders 202a-c are currently fluidly connected and subjected to a common inner pressure. Although the bladders 202a-c are made from the same first material 203, the hybrid bladder 222b with the most second material 220 attached experiences the least amount of elongation "b". By contrast, the inner bladder 202a with no secondary material 220 experiences the greatest length of stretching "a" while the hybrid bladder 222c with an intermediate amount of second material 220 is stretched to a length "c" in between that of the other bladders 202a, 222b. This is due to the second material 220 reducing the elasticity of the hybrid bladders 222b, 222c in accordance with the amount of second material 220 attached thereto. In this way, the shoe sole 250 can be custom formed to provide ergonomic benefits.

Figure 7:
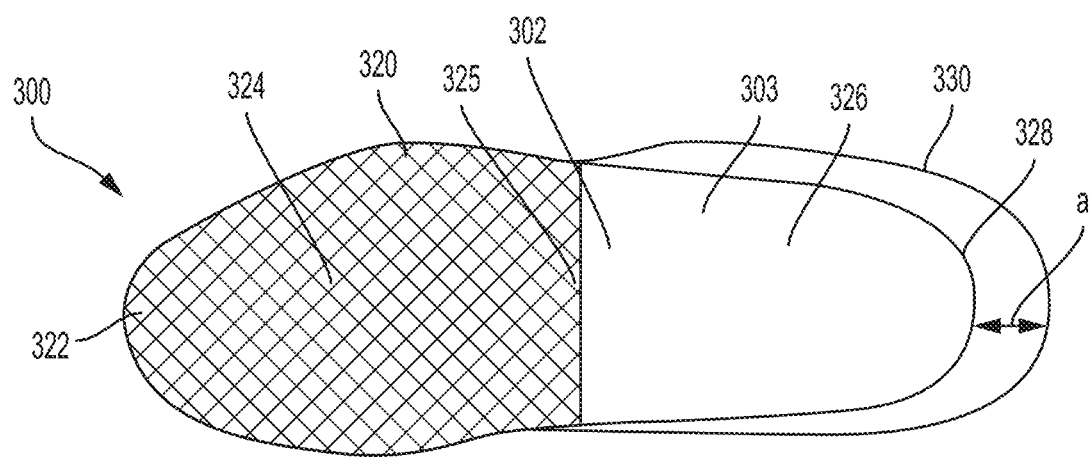
FIG. 7 is an overhead view of a family cell in accordance with the subject technology, in both an inflated and deflated state.

Referring now to FIG. 7, the subject technology is shown in use with a family cell 300 containing only a single bladder 302. A first area 324 of roughly half of the bladder 302 is covered by a second material 320, forming a hybrid bladder 322, while a second area 326 of the other half of the bladder 302 remains formed from only the first material 303. In this case, the second material 320 is extremely resistant to stretch. Therefore, when the family cell 300 is subjected to an inner pressure, the first area 324 stretches negligibly, or not at all, while the second area 326 experiences visible stretching "a". In the embodiment shown, the narrower outer surface 328 represents the outer surface when the family cell 300 has been subjected to little or no outside pressure. Once the family cell 300 has been subjected to an inner pressure, the portion of the family cell 300 not covered by the second material 320 expands, stretching by a length "a", to have a wider outer surface 330. The stretching length "a" lessens near the arch portion 325 of the sole 350, where some area is covered by second material 320 and some is not. The stretching length "a" is non-existent near the middle of first area 324 which is completely covered by the second material 320.

Figure 8:
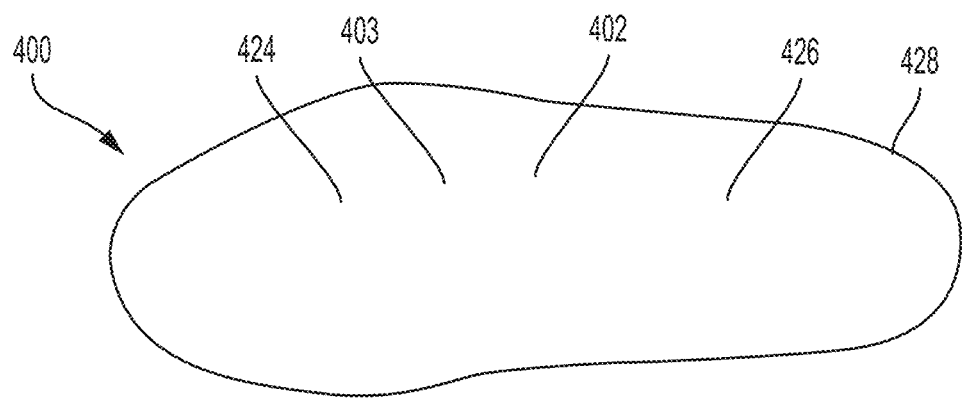
FIG. 8 is an overhead view of a family cell employed with a shoe sole that is lacks the second material of the subject technology.
Figure 9:
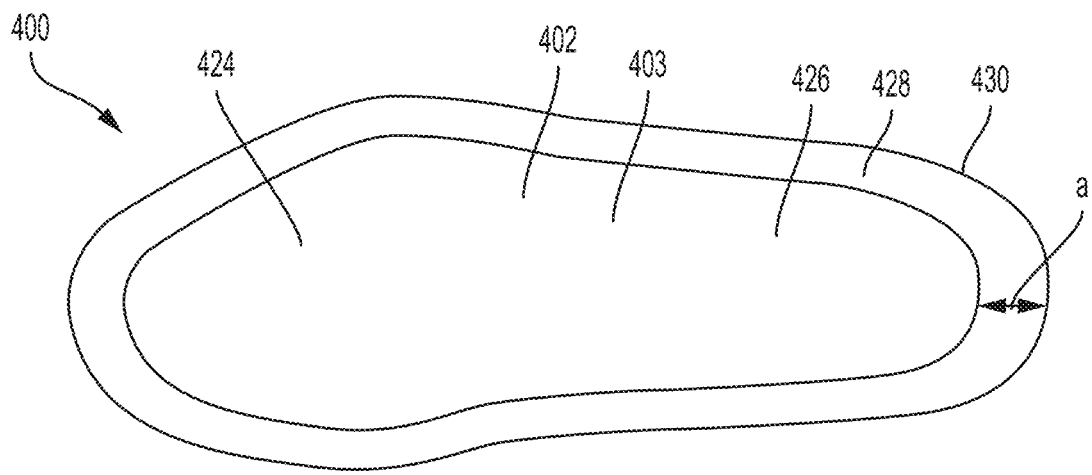
FIG. 9 is an overhead view of the family cell of FIG. 8 in both an inflated and deflated state.

Referring now to FIGS. 8-9, the shoe sole 350 of FIG. 7 is shown, except that the family cell 400 does not include a secondary material. In FIG. 8, the family cell 400 is shown with little or no inner pressure, while FIG. 9 shows a comparison of the outer surface of the family cell when it has an inner pressure 430 versus when it does not have an inner pressure 428. Thus, as seen in FIG. 9, the inner pressure causes expansion of the sole to a length "a" around the entire sole, and the expansion is not controlled through use of a second material, as seen in FIG. 7. Thus providing a second material, as in FIG. 7, can provide benefits, such as ergonomic benefits, by changing the elasticity of the family cell 400, and thus controlling expansion, in select locations.

Figure 10:
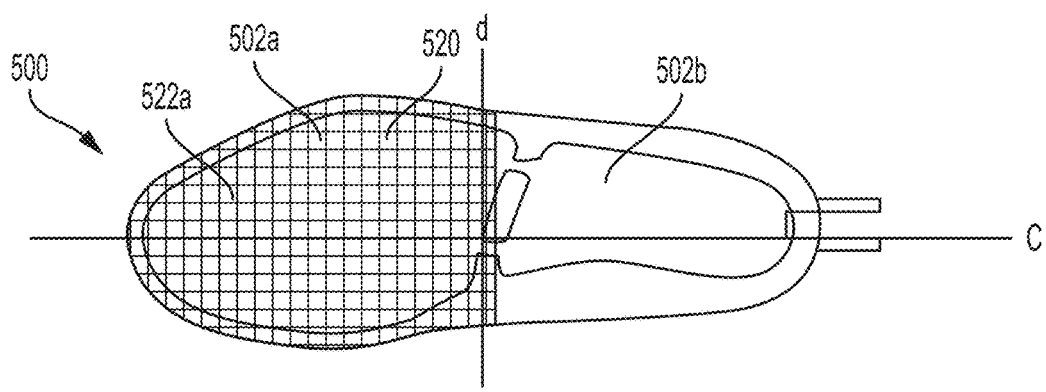
FIG. 10 is an overhead view of a family cell in accordance with the subject technology, employed with a shoe sole.
Figure 11:
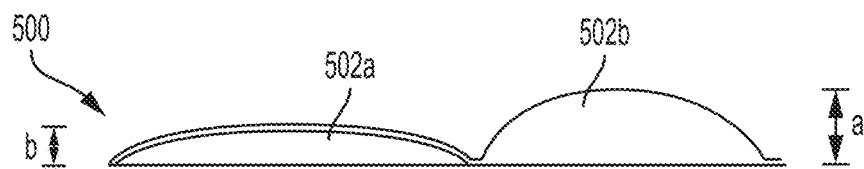
FIG. 11 is a side view of the family cell of FIG. 10 showing the varying heights of the stretched inner bladders.
Figure 12:
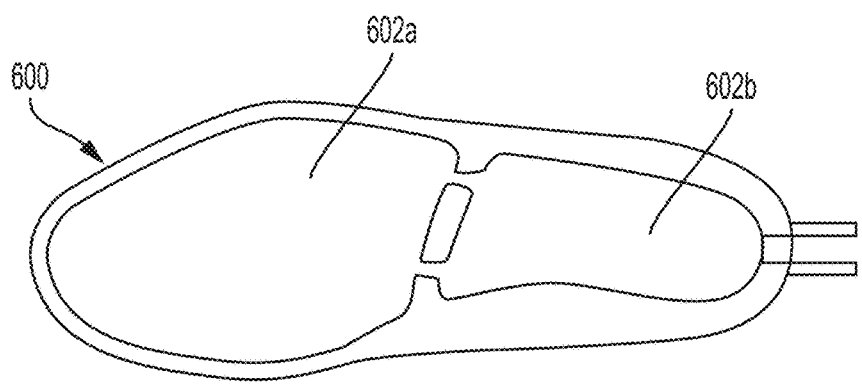
FIG. 12 is an overhead view of a family cell employed with a shoe sole that is lacks the second material of the subject technology.
Figure 13:
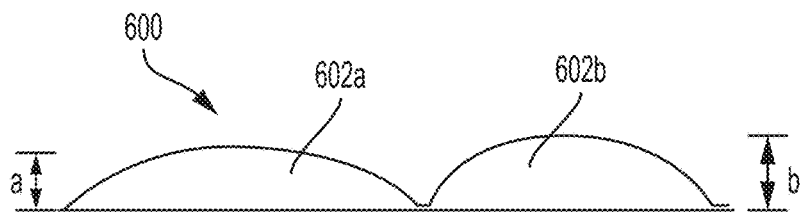
FIG. 13 is a side view of the family cell of FIG. 12 showing height of the stretched inner bladders.

Similarly, referring to FIGS. 10-13, family cells 500, 600 with two bladders 502a, 502b and 602a, 602b respectively, are shown. As in FIGS. 7-9, the expansion "a" of the family cell 600 with no second material (FIGS. 12-13), can be compared to the expansion "b" of the same family cell 500 having second material 520 over one of the inner bladders 502a (FIGS. 10-11). As discussed before, the second material 520 limits the expansion of the inner bladder 502a to a length "b" that is less than the length "a" of expansion of the bladders 502b, 602a, 602b with no second material 520.

As seen above, it should be understood the subject technology can be employed with a range of bladder quantities. While smaller quantities of inner bladders are typically shown for explanatory purposes, the subject technology can be employed with any number of inner bladders, as needed to facilitate the purpose of the various products with which the subject technology is used.

The second material may be formed by using various techniques such as molding, laminating, casting, or silk screening. One skilled in the art will understand that the ideal technique will depend on type of product with which the user is incorporating the subject technology. For example silk screening could be used when a product application needs a thin membrane, such as when the end product is a sleeping pillow. High strength needs, such as athletic and safety equipment, may require laminating of dissimilar materials, or foam with variable die cut patterning to create both the desired elongation and cooling. Casting may be used in an application that would require spacing for air cooling or channels for other functions. Casting can be used as a secondary process in lower volume or higher cost applications and products. Molding may be preferred for higher strength materials that are suitable for higher volume production. Molding may be used to achieve multiple functions, such as wiring, inclusion of other components, or mounting, for example.

Further, the second material can be formed using a variety of material types, such as copper, diamond paste, polymer urethane, silicone, or other materials such as those typically employed in cushion technology. Alternatively, or additionally, the second material can be formed by one or more fabrics of the type typically employed in cushion technology. The second material type, as well as the forming technique, can be changed depending on the desired properties and application. For example, by utilizing a second material that includes copper or diamond paste, the second material can shield the family cell from electromagnetic and radio waves. By way of further example, silicone has heat dissipation properties, so utilizing a silicone based second material can provide heat dissipation properties to the hybrid bladder to which it is attached, and therefore, to the family cell. This will allow the subject technology to also be used as a heat sink carrying heat away from the source. The second material can also be formed to increase air circulation across the hybrid bladder. For example, diamond compounds such as micro diamond infused aircool memory foam are added to memory foams for cooling on pillows and beds. Diamond compounds may be used with silicone or urethane based materials in the casting, molding, laminating, or silkscreen process. Similarly, copper is used as earth ground and may be incorporated into the material to allow a neutralizing field for electromagnetic radiation.

The second material can also have a particular hardness depending on the properties the user wishes to achieve. For example when the second material has a hardness of 65 to 85 Shore A, the second material is suitable for use in a shoe sole.

The second material may also be formed to show graphics on a surface of the fabric. Graphics may include lines and typeface for branding. Graphic lines of printed second material can be varied both in density and line thickness to help achieve the correct elongation and to keep the first material flexible. This can also help to control vibration of any valves or conduits that pass fluid between the inner bladders. Another use of this manufacturing method can also achieve graphics by the accurate placement of material and branding for the marketing of the product.

For example, referring to FIG. 10, lines of second material can be designed and applied such that they are oriented perpendicular to the natural stretch of the material for the best results. If this method is being used for two way stretch material, a cross hatch pattern can be used. Thus, by running the lines of second material 520 in cross hatching pattern, running across the exterior surface of the hybrid bladder along a longitudinal and transverse axis "c", "d", the second material 520 reduces elongation most effectively along those axes "c", "d". Other variable patterns can also be used, and are discussed more fully below.

Figure 25:
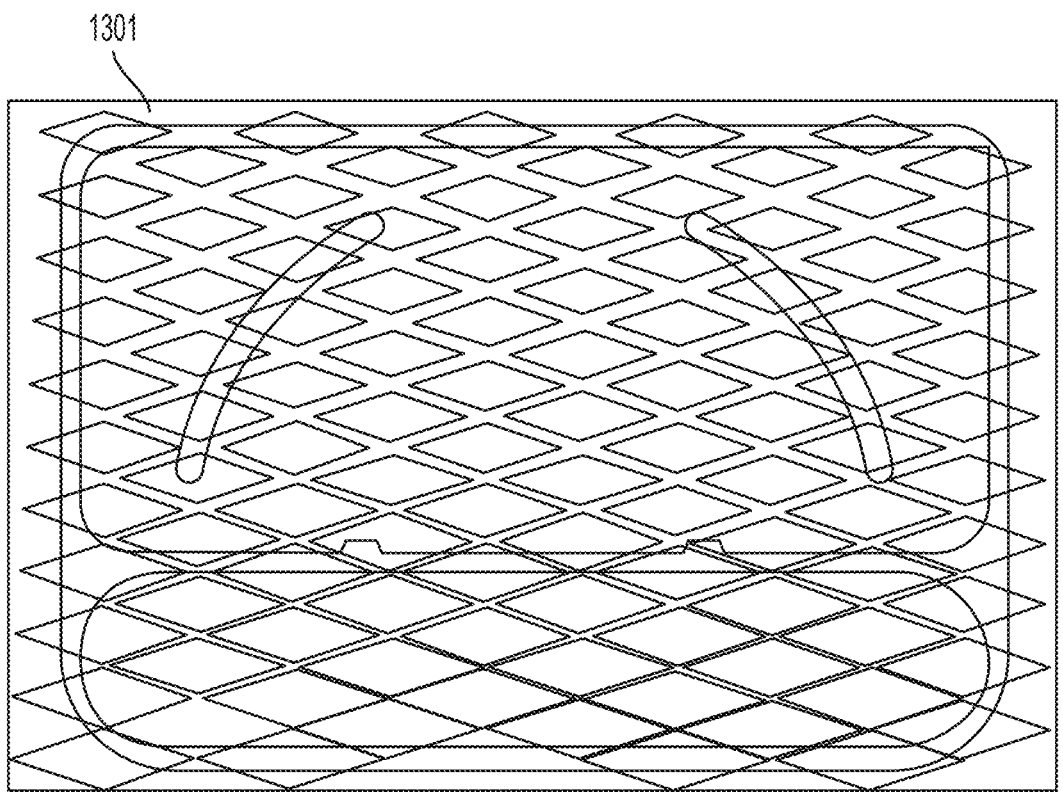
FIG. 25 is an overhead view of a family cell in accordance with the subject technology employed with a fabric.
Figure 26:
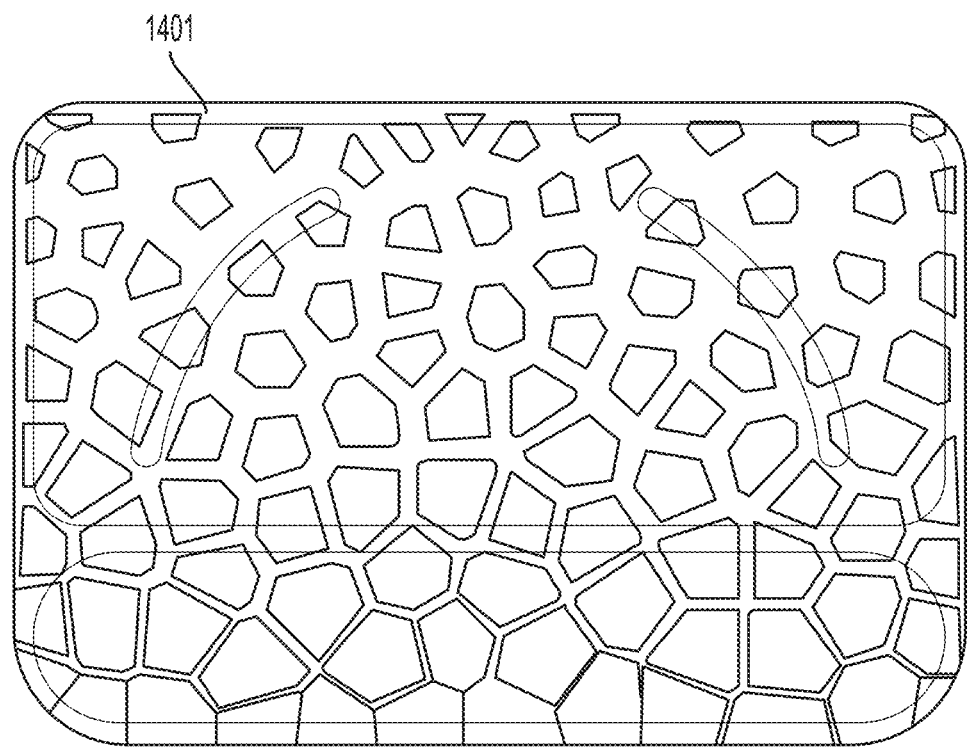
FIG. 26 is an overhead view of a family cell in accordance with the subject technology employed with a fabric

Referring now to FIGS. 14-32, a variety of implementations of the subject technology are shown. For illustrative and explanatory purposes, the technology is sometimes shown on a shoe sole (FIGS. 14-22, 30), a pillow (FIGS. 23-24), a seat cushion (FIG. 31), or a football helmet (FIGS. 27-28) while at other times the technology is shown on a fabric or material, separated from any particular product (FIGS. 25-26). Therefore, as discussed above, it should be understood that the technology disclosed herein is suited for a wide range of particular products and applications outside of just shoe soles.

Figure 14:
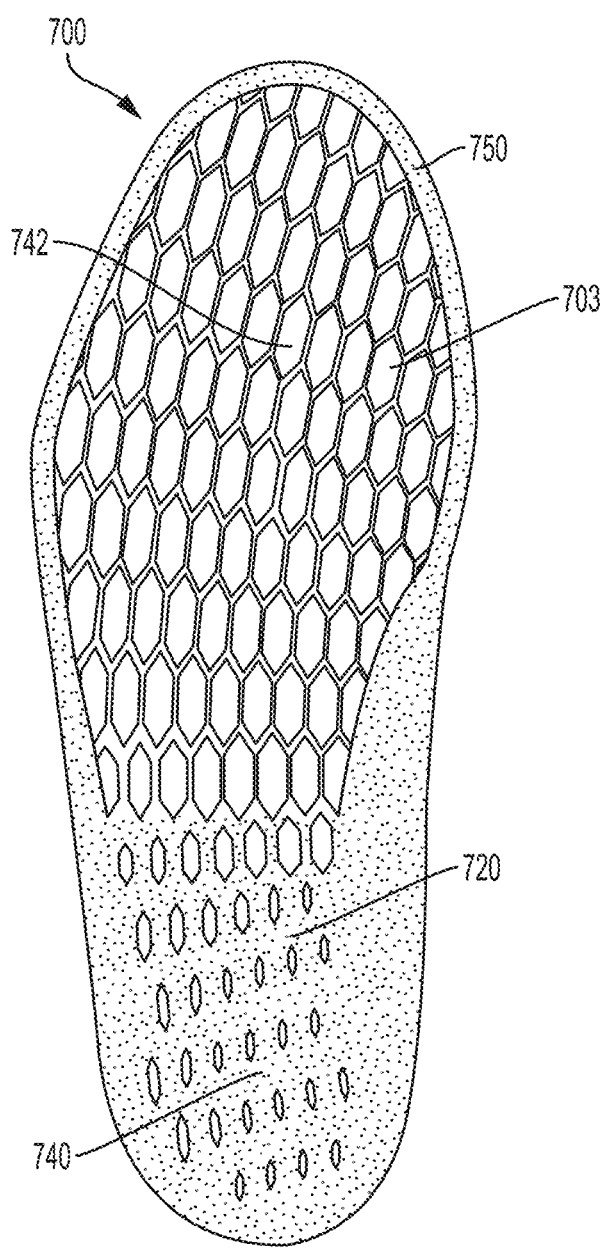
FIG. 14 is an overhead view of a family cell having a variable pattern of second material in accordance with the subject technology employed with a shoe sole.
Figure 17:
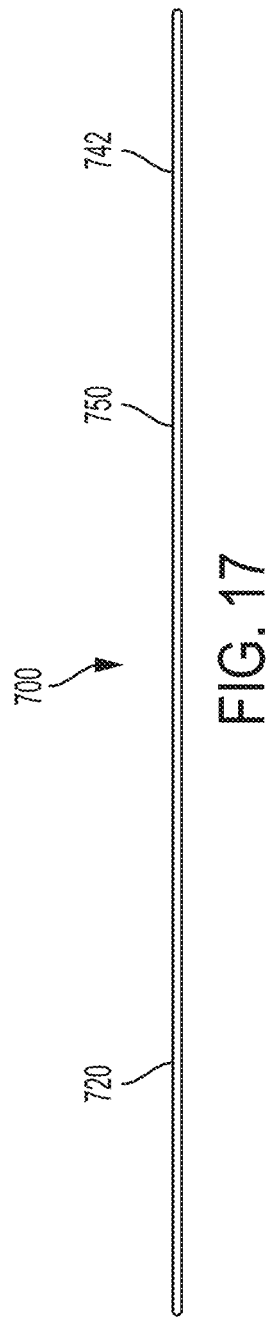
FIG. 17 is a side view of the family cell of FIG. 15

Referring now to FIG. 14, a shoe sole 750 in accordance with the subject technology is shown. The shoe sole has a first material 703 which is partially covered by a second material 720 of a lesser elasticity. The second material 720 is provided such that from an overhead view gaps in the second material 720 cause the first material 703 to show through in the shape of irregular hexagons. More second material 720 is provided to areas of the sole 750 where a lower elasticity is desired. For example, as shown, the calcaneus portion 740 of the sole has a greater amount of second material 720 while the metatarsal portion 742 has a lesser amount of second material 720.

Figure 18:
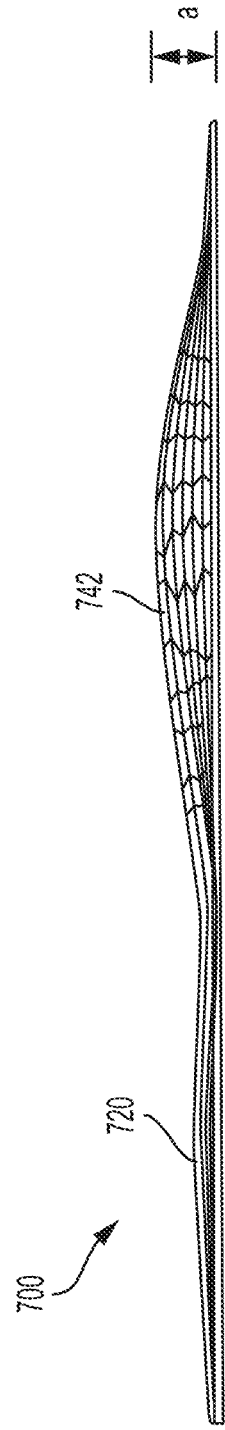
FIG. 18 is a side view of the family cell of FIG. 16.
Figure 19:
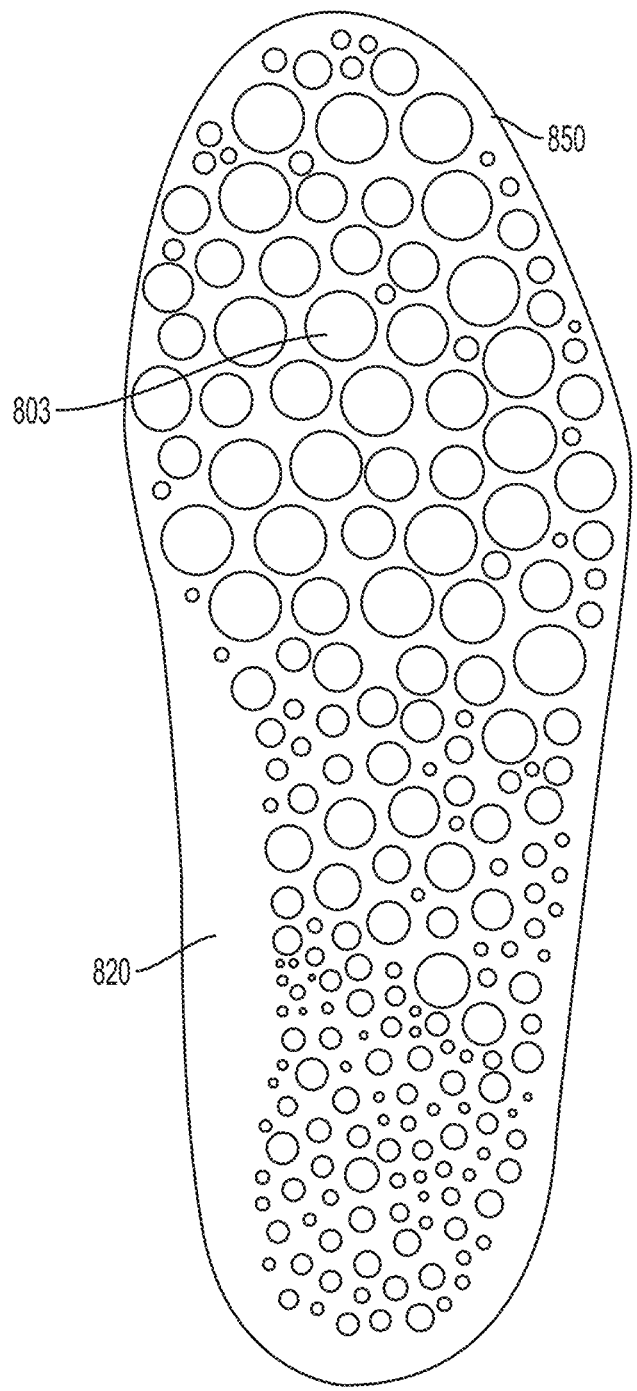
FIG. 19 is an overhead view of a family cell having a variable pattern of second material in accordance with the subject technology employed with a shoe sole.
Figure 20:
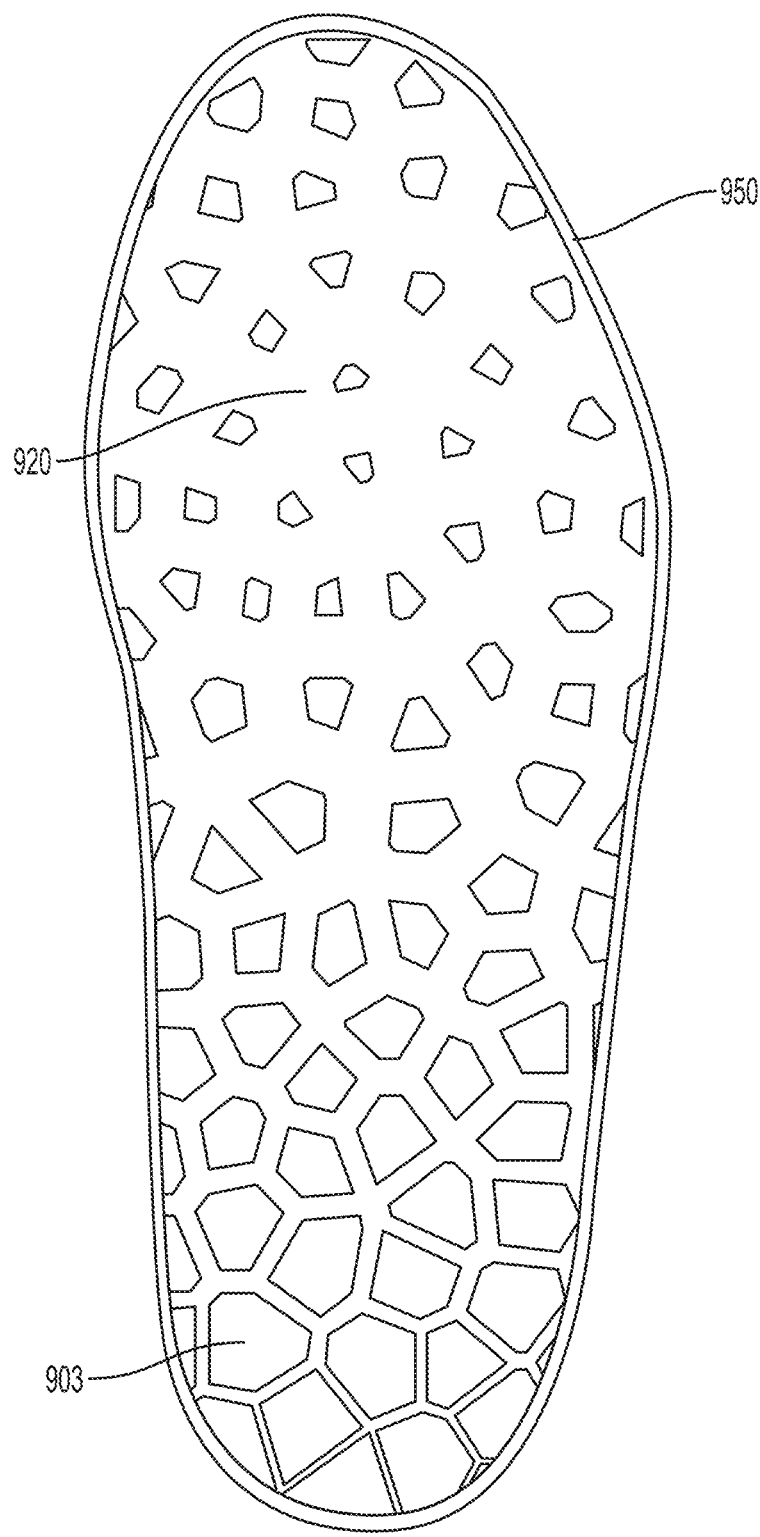
FIG. 20 is an overhead view of a family cell having a variable pattern of second material in accordance with the subject technology employed with a shoe sole.
Figure 21:
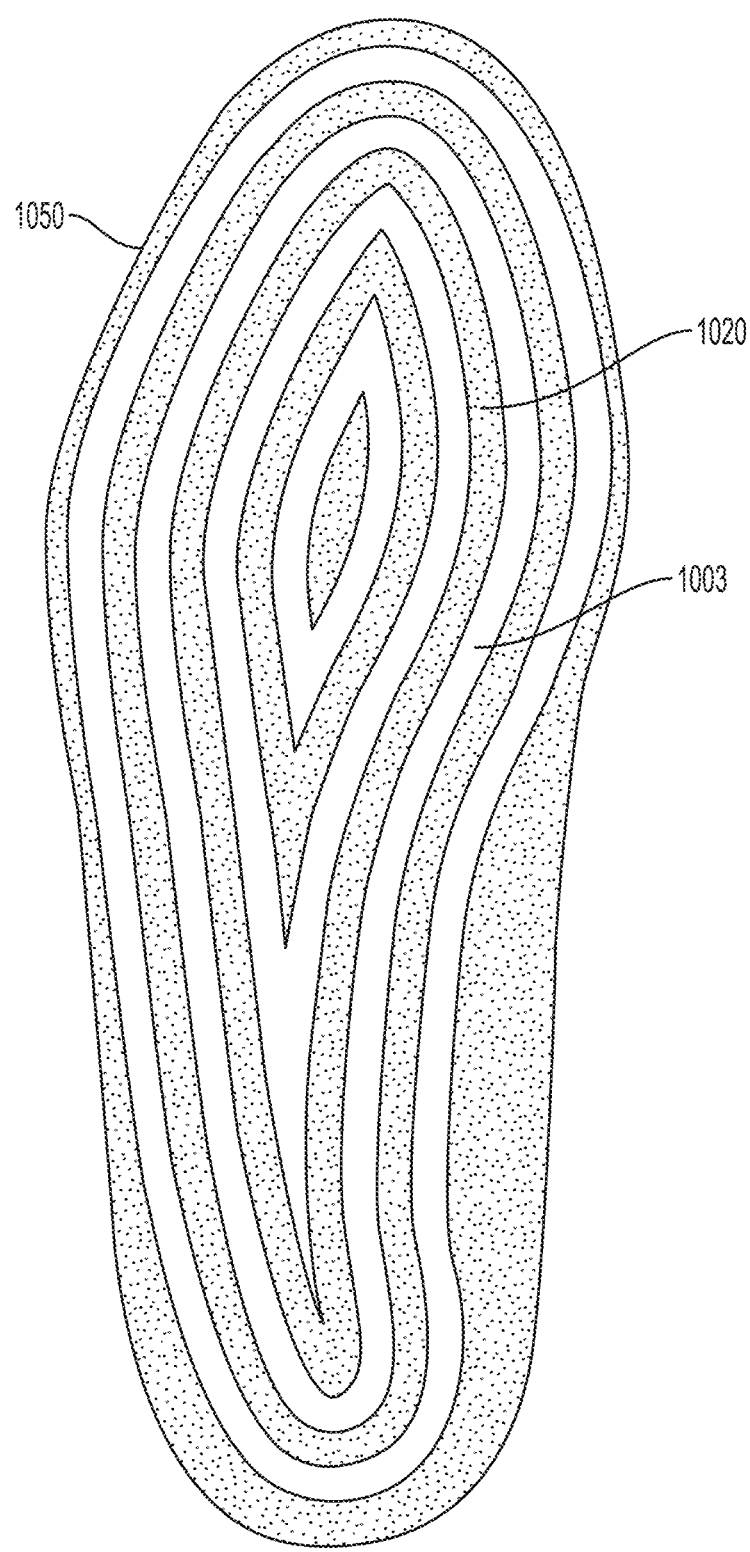
FIG. 21 is an overhead view of a family cell having a variable pattern of second material in accordance with the subject technology employed with a shoe sole.
Figure 22:
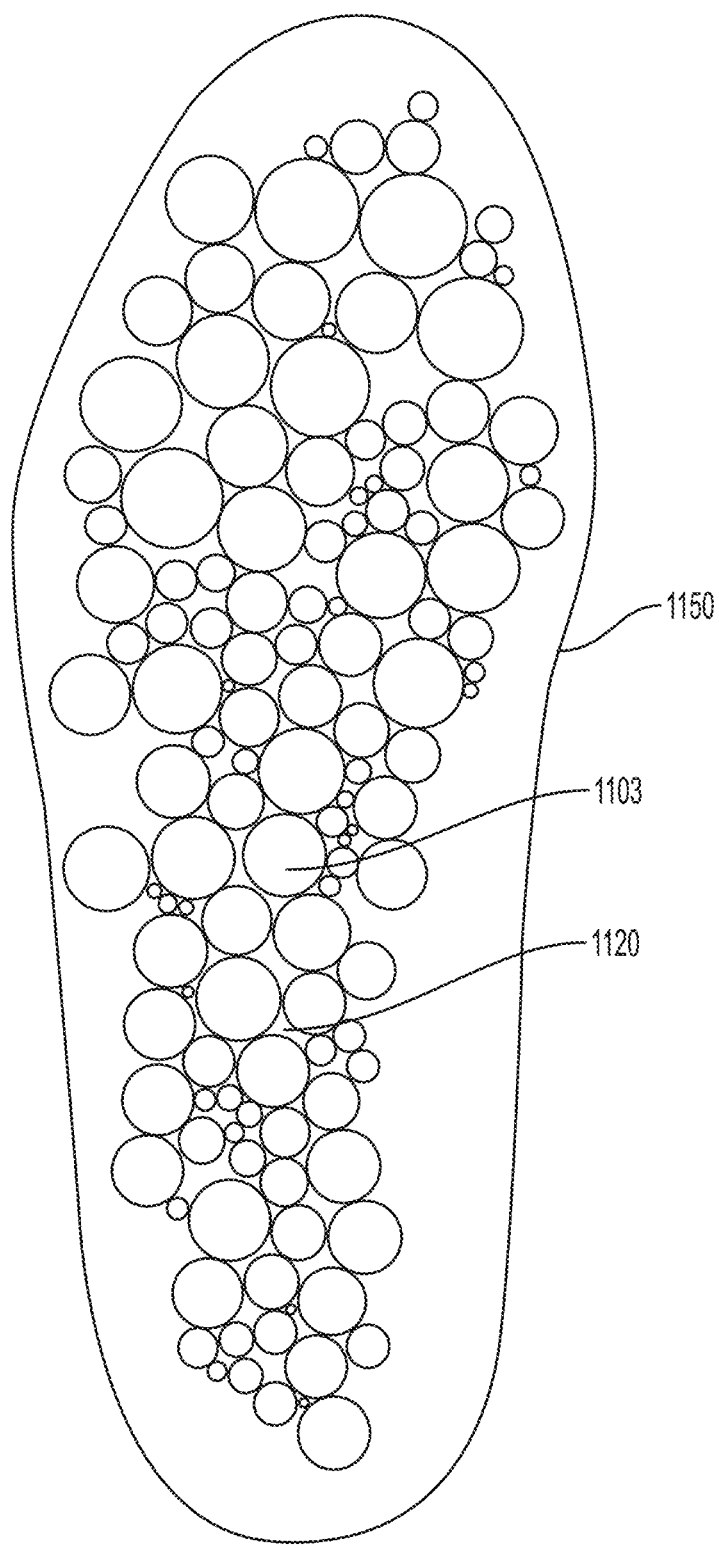
FIG. 22 is an overhead view of a family cell having a variable pattern of second material in accordance with the subject technology employed with a shoe sole.

Referring now to FIG. 15-18, the shoe sole 750 of FIG. 14 is shown. For comparison, the shoe sole 750 has a family cell 700 shown with a negligible inner pressure (FIGS. 15, 17) compared to a sole 750 where the family cell 700 has a noticeable inner pressure (FIGS. 16, 18). When given an inner pressure (i.e. FIGS. 16, 18), the family cell 700, and therefore the sole 750, expands, the expansion at each location of the sole 750 being proportional to the amount of second material 720 nearby. As such, the pressurized family cell 700 expands the greatest amount "a" (See FIGS. 16, 18) in the areas with the least amount of second material 720.

Referring now to FIGS. 19-22, shoe soles 850, 950, 1050, 1150 with second material 820, 920, 1020, 1120 in a variety of patterns are shown. The variable patterns are applied on the hybrid bladders of a family cell (not shown distinctly on these figures) which, depending on which pattern is employed, provide additional or different properties such as varying elasticity across the family cell. The variable patterns can be employed to different effects, such as to prevent stretching in various locations and also to reduce, or dampen vibrations across select locations of the family cell. For example, variable patterns could be employed using a soft material over an area of expected pressure or impact to reduce the velocity of any sudden force that strikes that area.

Figure 23:
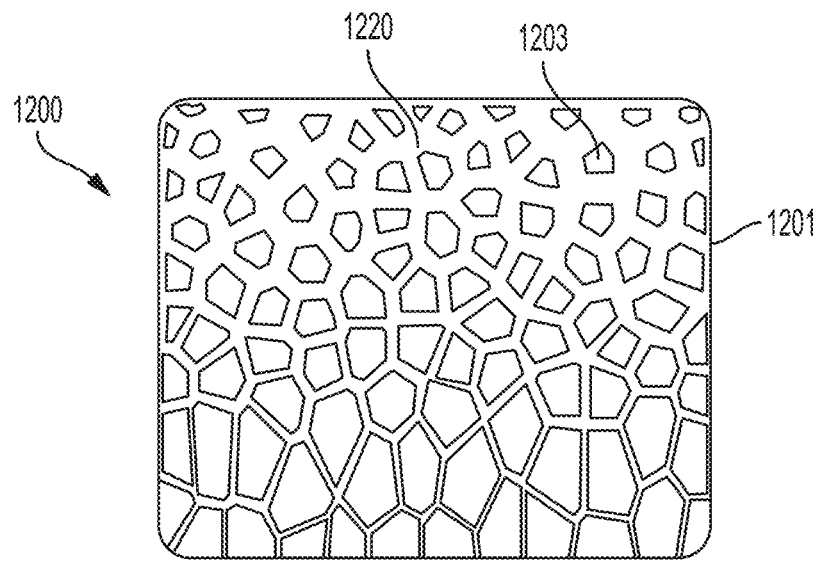
FIG. 23 is an overhead view of a family cell in accordance with the subject technology employed with a fabric forming a pillow.
Figure 24:
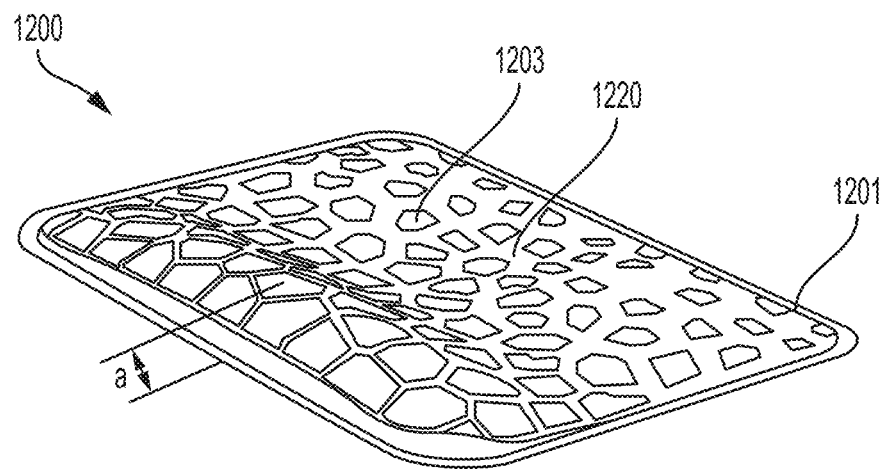
FIG. 24 is a perspective view of the pillow of FIG. 23 in an inflated state.

Referring now to FIGS. 23-24, a family cell 1200 in use with a fabric 1201 in accordance with the subject technology is shown. In this case, the fabric 1201 has been shaped to form a pillow. The fabric 1201 employing the subject technology functions much the same way as the technology as applied in the examples of the subject technology with respect to shoe soles, as described above. For example, the fabric 1201 includes a first fabric material 1203 that is covered, to varying degrees in different areas, with a second fabric material 1220 having a lesser elasticity. When the fabrics are given an inner pressure, the various areas of the fabrics expand to various degrees depending on the amount of second fabric 1220 in that area. As seen in FIG. 24 the greatest expansion "a" occurs in the areas with the least second fabric 1220, while the areas with a large amount of second fabric 1220 have little or no expansion.

Figure 27:
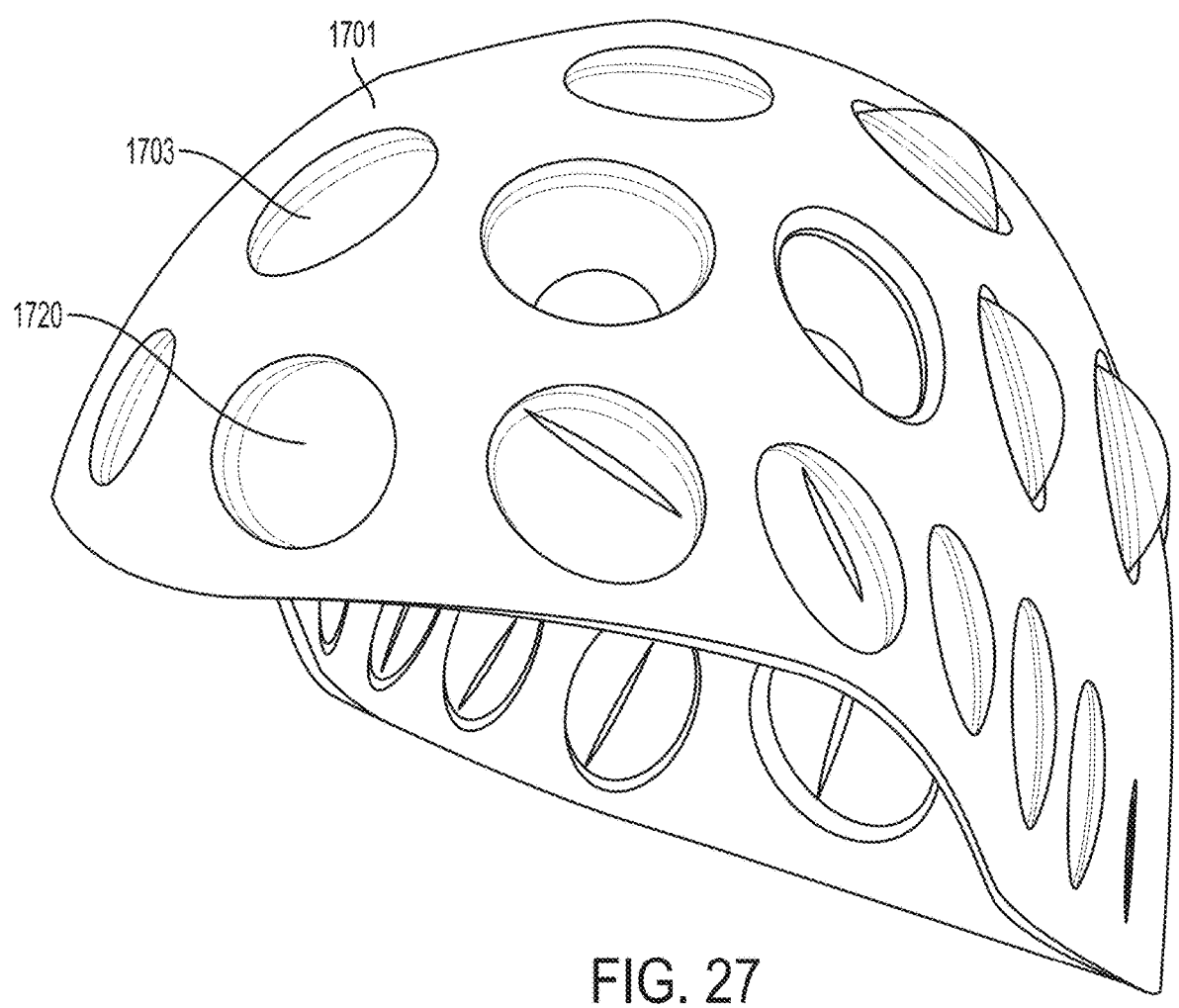
FIG. 27 is a perspective view of a family cell in accordance with the subject technology employed in a fabric within a football helmet.
Figure 28:
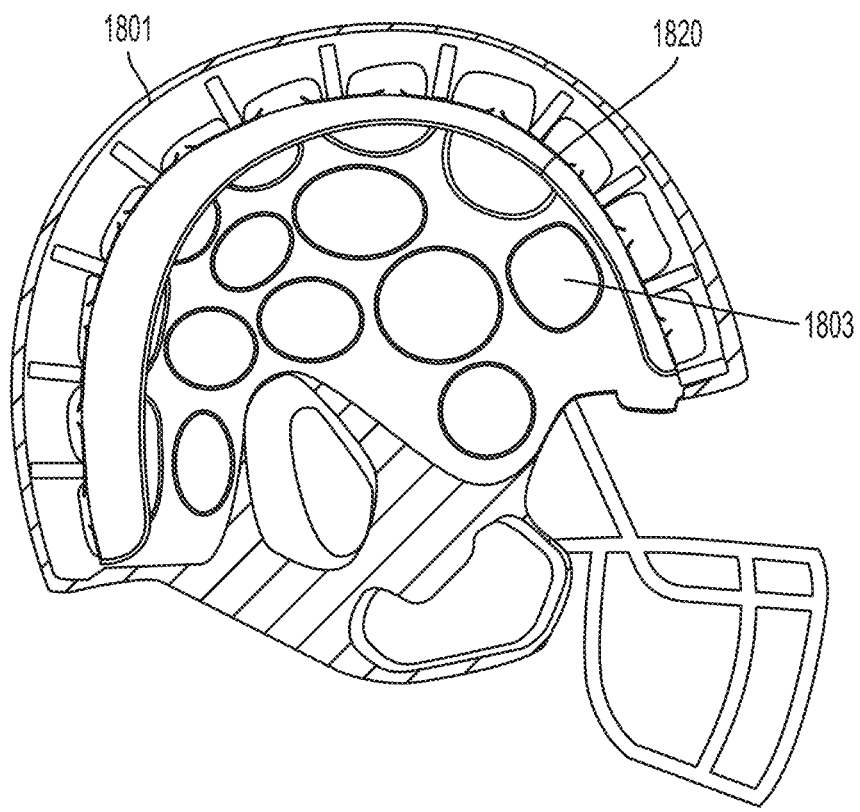
FIG. 28 is a side view of a family cell in accordance with the subject technology employed in a fabric within a football helmet.
Figure 29:
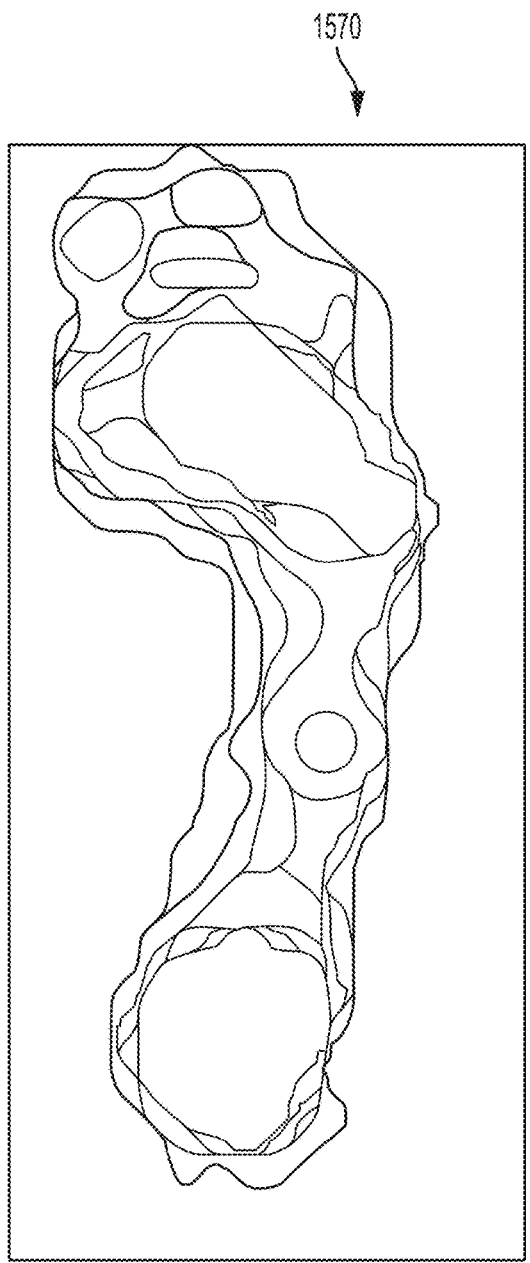
FIG. 29 is a pressure map of the foot of a standing human, showing areas of expected pressure.
Figure 30:
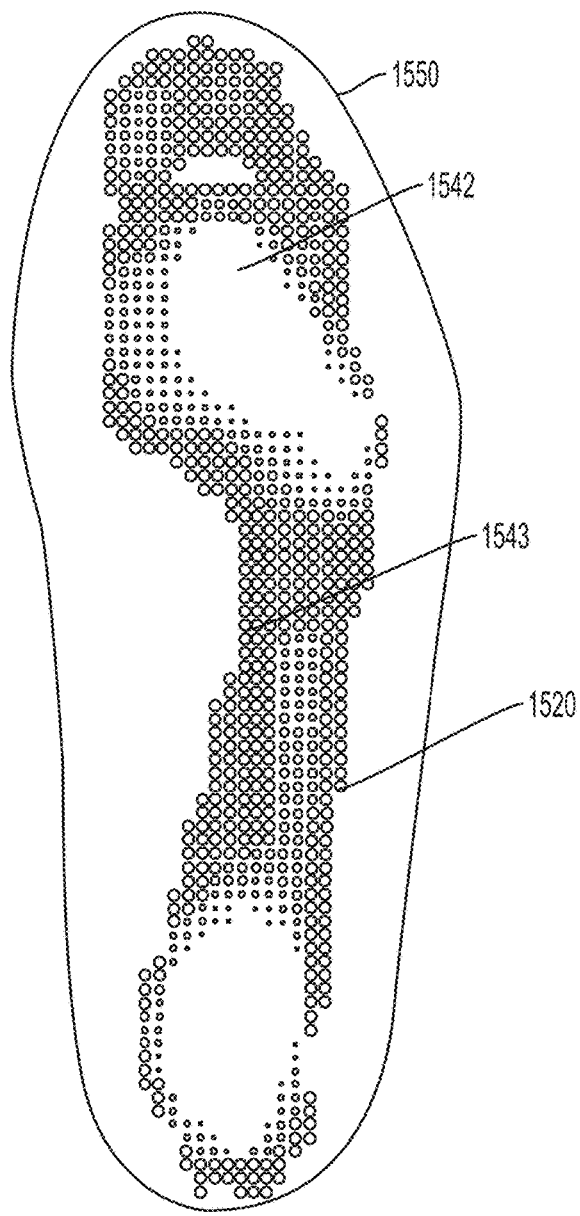
FIG. 30 is an overhead view of a family cell having a variable pattern of second material to align with the areas of expected pressure from the pressure map of FIG. 29.

By providing the subject technology with a fabric 1201, the subject technology can incorporated in a wide range of products. Much like the various patterns shown above with respect to the shoe sole examples (i.e. FIGS. 19-22), the pillow could use fabric having a variety of patterns, as seen in FIGS. 25-26. The fabric of the subject technology also has a variety of applications, such as in a football helmet, to help avoid concussions and other head injuries, as seen in FIGS. 27-28.

Referring now to FIGS. 29-32, the subject technology is shown in various embodiments corresponding to pressure maps. For example, in FIG. 29, the pressure map of the foot of a standing human is shown generally at 1570. Accordingly, in FIG. 30, the subject technology is employed with a shoe sole 1550 to provide ergonomic benefits based on the area of greatest expected pressure. Where the pressure maps shows a large amount of pressure, little or no secondary material 1520 can be provided to allow the greatest stretching of the shoe sole 1550 (i.e. the metatarsal portion 1542). These areas will then stretch the most, providing a larger cushion for a user's foot in areas that correspond with the greatest expected pressure. By contrast, areas with lower expected pressure (i.e. the arm portion 1543) have more second material 1520, and areas with an intermediate expected pressure have an intermediate amount of second material 1520.

Figure 31:
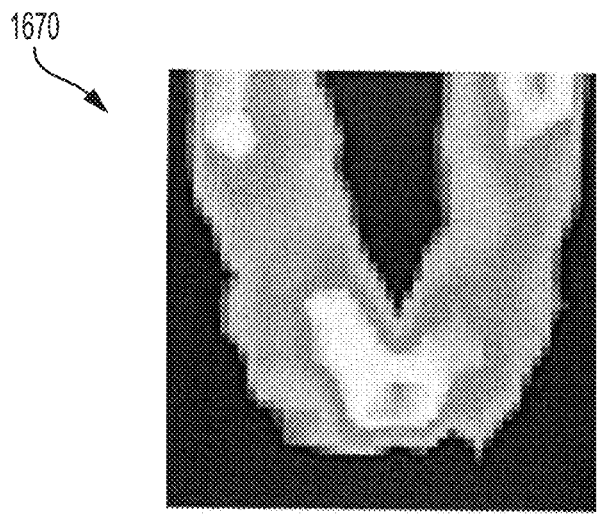
FIG. 31 is a pressure map of the thighs and buttocks of a sitting human, showing areas of expected pressure.
Figure 32:
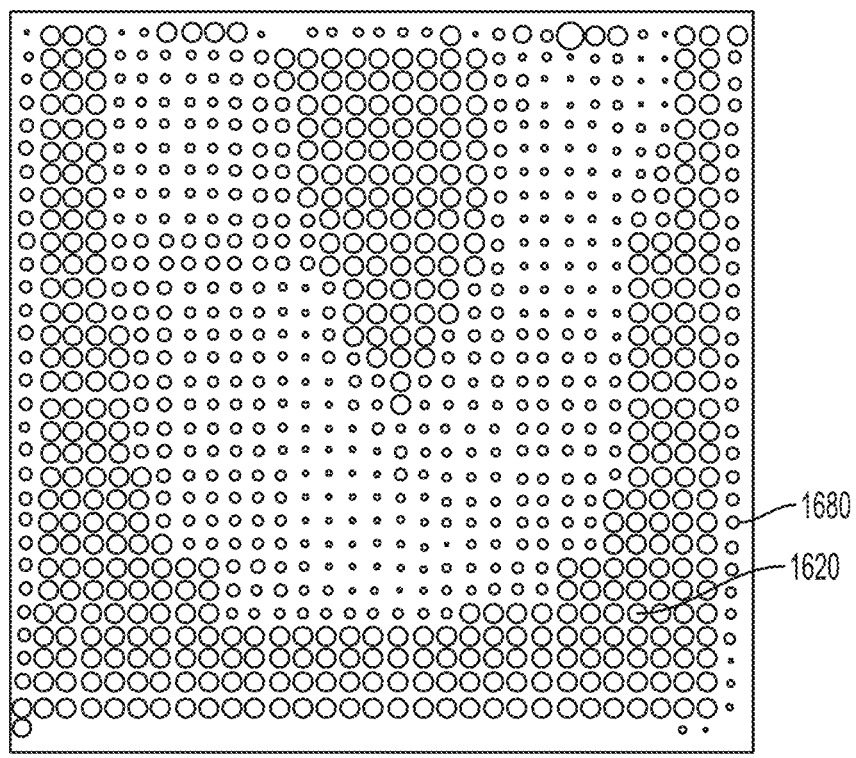
FIG. 32 is an overhead view of a family cell having a variable pattern of second material to align with the areas of expected pressure from the pressure map of FIG. 31.

Similarly, referring now to FIGS. 31-32, the subject is shown corresponding to the pressure map of a seat cushion 1680. As with the sole 1550 of FIG. 30, the areas with the greatest expected pressure are covered with the least amount of secondary material 1620 (i.e. directly under the user's legs and buttocks) and vice versa. This can provide ergonomic benefits to a user.

While the family cells and fluidly connected inner bladders shown herein often share a common inner pressure, it should be noted that inner bladders within a family cell need not have the same inner pressure. Valves between the inner bladders can allow certain of the inner bladders to have a lesser or greater pressure than other bladders, in accordance with other products using "cell flow technology."

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, interfaces, computers, servers and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the invention.

The invention claimed is:

1. A process of making a family cell of homogenous inner bladders with varying elasticity comprising:
    forming a plurality of inner bladders from a first material, the first material having a first elasticity, wherein each of the plurality of inner bladders has an interior surface defining an inner chamber, the inner chamber configured to store a fluid therein; and an exterior surface is exposed to an outside environment;
    fluidly connecting the plurality of inner bladders to form a family cell;
    selecting, from the plurality of inner bladders, at least one hybrid bladder; and
    providing, on the exterior surface of the at least one hybrid bladder, a second material having a second elasticity, the second elasticity being less than the first elasticity,
    wherein the second material reduces the elastic qualities of the at least one hybrid bladders.

2. The process of claim 1, wherein the second material is at least one of the following: molded; laminated; cast; or silk screened.

3. The process of claim 2, where the second material increases heat dissipation across the at least one hybrid bladders.

4. The process of claim 3, where the second material increases air circulation across the at least one hybrid bladders.

5. The process of claim 1, wherein the second material forms at least one variable pattern.

6. The process of claim 5, wherein the at least one variable pattern dampens vibrations across the at least one hybrid bladders.

7. The process of claim 6, wherein the second material has a hardness of 65 to 85 Shore A.

8. The process of claim 6, wherein the at least one variable pattern creates at least one zone of varying elasticity across the family cell.

9. The process of claim 5, wherein the at least one variable pattern corresponds with a pressure mapping diagram, the pressure mapping diagram reflecting areas of expected pressure between a cushion and a user.

10. The process of claim 1, wherein the second material is formed, at least in part, with one of the following materials: copper; or diamond paste.

11. The process of claim 10, wherein the second material shields the hybrid bladder electromagnetic and radio waves.

12. The process of claim 1, wherein the second material is formed, at least in part, with polymer urethane.

13. The process of claim 1, wherein the second material is formed, at least in part, with silicone for dissipating heat across the hybrid bladder.

14. The process of claim 1, wherein the family cell is connected to a sports helmet to reduce the likelihood of head injuries.

* * * * *